United States Patent [19]

Langebrake

[11] 4,424,975

[45] Jan. 10, 1984

[54] ROTARY SHAFT SEAL

[75] Inventor: Clair O. Langebrake, Waverly, Ohio

[73] Assignee: The United States of America as represented by the United States Department of Energy, Washington, D.C.

[21] Appl. No.: 488,300

[22] Filed: Apr. 25, 1983

[51] Int. Cl.³ .............................................. F16J 15/34
[52] U.S. Cl. .................................... 277/81 R; 277/27
[58] Field of Search ...................... 277/3, 27, 80, 81 R, 277/900

[56] References Cited

U.S. PATENT DOCUMENTS

| | | | |
|---|---|---|---|
| 3,304,132 | 2/1976 | Broeze | 308/1 |
| 3,351,393 | 11/1967 | Emmerich | 308/9 |
| 3,359,045 | 12/1967 | Hsu | 308/1 |
| 3,390,559 | 7/1968 | Steutzer | 70/275 |
| 3,471,205 | 10/1969 | Farron et al. | 308/9 |
| 3,499,653 | 6/1968 | Gardner | 277/27 |
| 3,657,581 | 4/1973 | Hoogenboom | 308/9 |
| 3,663,026 | 5/1972 | Mincuzzi | 277/81 R |
| 3,685,839 | 8/1972 | Frei | 277/27 |
| 3,725,986 | 4/1973 | Hoogenboom | 29/25.35 |
| 3,782,737 | 1/1974 | Ludwig | 277/27 |
| 3,902,084 | 8/1975 | May | 310/8.1 |
| 3,902,085 | 8/1975 | Bizzigotti | 310/8.3 |
| 4,360,207 | 11/1982 | Rappange et al. | 277/81 R |

*Primary Examiner*—Robert I. Smith
*Attorney, Agent, or Firm*—Fred O. Lewis; Stephen D. Hamel; Richard G. Besha

[57] ABSTRACT

The invention is a novel rotary shaft seal assembly which provides positive-contact sealing when the shaft is not rotated and which operates with its sealing surfaces separated by a film of compressed ambient gas whose width is independent of the speed of shaft rotation. In a preferred embodiment, the assembly includes a disc affixed to the shaft for rotation therewith. Axially movable, non-rotatable plates respectively supported by sealing bellows are positioned on either side of the disc to be in sealing engagement therewith. Each plate carries piezoelectric transducer elements which are electrically energized at startup to produce films of compressed ambient gas between the confronting surfaces of the plates and the disc. Following shutdown of the shaft, the transducer elements are de-energized. A control circuit responds to incipient rubbing between the plate and either disc by altering the electrical input to the transducer elements to eliminate rubbing.

18 Claims, 5 Drawing Figures

ROTARY SHAFT SEAL

BACKGROUND OF THE INVENTION

This invention relates generally to rotary shaft seals. More particularly, it relates to an improved rotary shaft seal designed to provide positive-contact sealing when at rest and gap-type operation when rotated. The invention is a result of a contract with the United States Department of Energy.

Plate-type rotary shaft seals are known which are designed to operate with a clearance when rotated and to provide positive-contact sealing at rest. For example, U.S. Pat. No. 3,782,737 (L. Ludwig; Jan. 1, 1974) and U.S. Pat. No. 3,499,653 (J. Gardner; Mar. 10, 1970) describe spiral-groove viscoseals designed to provide positive sealing in the static mode and a gas-containing running clearance during operation. Both of those seals are subject to the disadvantage that some rubbing of the seal plates occur at startup and shutdown. U.S. Pat. No. 3,685,839 (A. Frei; Aug. 22, 1972) describes a hydrostatic seal having an axially movable, non-rotatable member which is biased toward a rotatable member. At startup, when the system pressure is below a selected value, a pressure-responsive piston assembly moves the axially movable member away from the rotatable member. When that pressure exceeds the selected value, the piston assembly is deactivated, permitting the non-rotatable member to move somewhat closer to the rotatable member. In general, conventional positive-clearance sealing devices are subject to the disadvantage that they are speed-dependent, pressure-dependent, or temperature-dependent to a significant extent.

U.S. Pat. No. 3,725,986 (L. Hoogenboom; Apr. 10, 1973) relates to power transducers of the piezoelectric type and to a method for mounting the elements thereof so as to achieve high transmission efficiency between the transducer and its supporting body. U.S. Pat. No. 3,657,581 (L. Hoogenboom; Apr. 18, 1972) disclosed a squeeze-film damper bearing utilizing a plurality of piezoelectric or magnetostrictive transducers to impart transverse oscillatory motion to one of the confronting surfaces of the bearing. An acoustic horn is used to couple the transducers to the bearing surface to be oscillated, with the result that the maximum axial movement of the surface is about 200 times the value of the thickness excursions of the crystal. These patents to Hoogenboom are incorporated herein by reference. U.S. Pat. No. 3,359,045 (S. Hsu; Dec. 19, 1967) discloses a squeeze-film bearing in which a tubular piezoelectric transducer is one of the bearing surfaces. U.S. Pat. No. 3,351,393 (C. Emmerich) describes the use of a pair of oppositely polarized piezoelectric discs which are energized alternately to oscillate an annular bearing mounted on a shaft. U.S. Pat. No. 3,471,205 (J. Farron et al) discloses a squeeze-film bearing in which a rotatable shaft is journaled on a layer of compressed air located on the inner surface of a piezoelectric member encircling the shaft.

SUMMARY OF THE INVENTION

It is an object of the invention to provide a novel rotary shaft seal.

It is another object to provide a plate-type rotary shaft seal assembly adapted to operate as a controllable-clearance seal when the shaft is rotating and as a positive-contact seal when the shaft is stationary.

It is another object to provide a plate-type sealing gland which in a non-actuated condition establishes positive-contact sealing and which in response to an applied electrical input develops an operating clearance which is essentially independent of the speed of rotation, temperature, and ambient gas pressure.

It is another object to provide a rotary-shaft sealing system for automatically maintaining the running clearance between adjacent rotating and stationary sealing surfaces at a value just sufficient to prevent contact.

As used herein, the term transducer element(s) includes piezoelectric crystals and magnetostrictors.

In one aspect, the invention is a shaft seal for use in gas atmospheres. The seal includes a sealing gland comprising a disc and a plate in face-to-face sealing relation. The disc is mounted on and rotatable with the shaft and carries an array of transducer assemblies which are disposed about the aforementioned axis. Each transducer assembly includes a transducer element which responds to electrical excitation by vibrating in the direction of the axis and which is mounted to impart its vibration to the plate. Means are provided for electrically exciting the transducer elements to effect axial vibration of the plate, which vibration generates an interfacial layer of compressed ambient gas between said plate and disc.

In another aspect, the invention is a rotary shaft seal assembly including a shaft which is rotatable about an axis, a housing containing a gas and encircling the shaft, an annular disc affixed to the shaft and extending radially therefrom, and an annular, non-rotatable, axially movable plate extending about the shaft and have a face in sealing contact with a face of the disc. A sealing bellows extends about the shaft and supports the plate. The bellows is mounted in compression, with one end being sealed to the outer face of the plate and its other end being sealed to the housing. An array of transducer elements is carried by the plate and is disposed about the axis. The transducer elements respond to electrical excitation by vibrating in the direction of the axis and are mounted in compression to impart vibration to the plate. Means are provided for electrically exciting the transducer elements to effect axial vibration of the plate and generate a compressed gas layer between the confronting surfaces of the plate and disc, thus providing a clearance therebetween. In another aspect, the invention is a method of sealing a shaft which is rotatable about an axis and encircled by a gas-containing housing. The method comprises providing a seal of the kind just described and electrically exciting the transducer elements from startup through shutdown of the shaft to vibrate the seal plate and maintain an operating clearance therebetween. In still another aspect, the invention is a dual-sealing-gland arrangement including a single disc flanked by two plate arrangements of the kind described above.

In another aspect, the invention is a shaft seal for use in a gas atmosphere and including a sealing gland comprising an annular disc and an annular plate in face-to-face sealing contact. The disc is affixed to the shaft, and the plate is movable along the axis of the shaft and resiliently biased toward the disc. The plate carries an array of transducer assemblies disposed about the axis, each including a transducer element of electrostrictive or magnetostrictive material. Each transducer element responds to electrical excitation by vibrating in the direction of the axis and is mounted to impart vibration to the plate. Means are provided for (a) impressing electrical excitation inputs on the transducer elements to effect axial vibration of the plate and generate and interfacial layer of compressed ambient gas between the plate and disc; (b) sensing incipient rubbing between the plate and disc; and (c) responding to said rubbing by changing the inputs to the transducer elements to effect increased separation of the plate and disc.

The drawings are not to scale.

DETAILED DESCRIPTION OF THE INVENTION

The invention is generally applicable to the sealing of rotatable shafts and the like. For convenience, it will be illustrated herein as utilized in a turbine system for expanding gaseous Freon, the invention being provided to restrict the outflow of Freon at above-atmospheric pressure along the shaft of the turbine during the period from startup through shutdown of the turbine.

Figure 1:
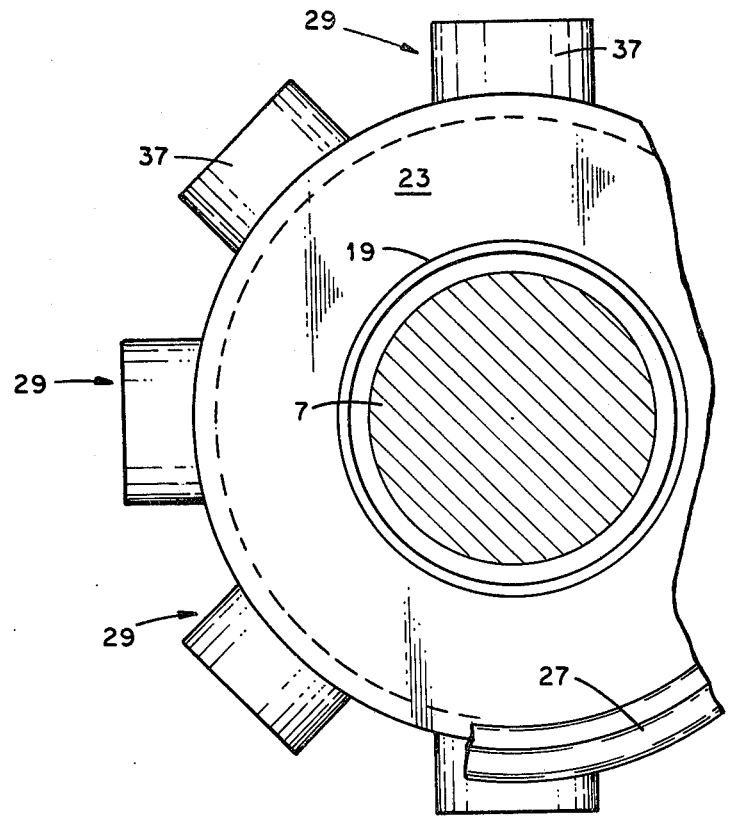
FIG. 1 is a fragmentary view, partly in cross section, of a dual-sealing-gland arrangement designed in accordance with the invention and mounted on a turbine shaft.
Figure 3:
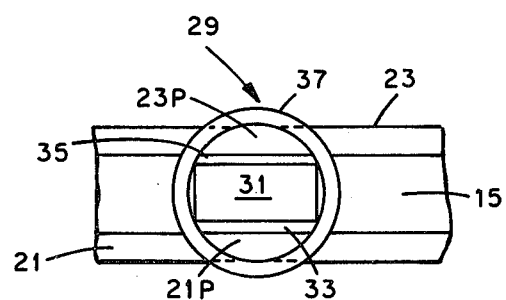
FIG. 3 is an end view of one of a plurality of transducer assemblies designated as 29 in FIG. 1.
Figure 2:
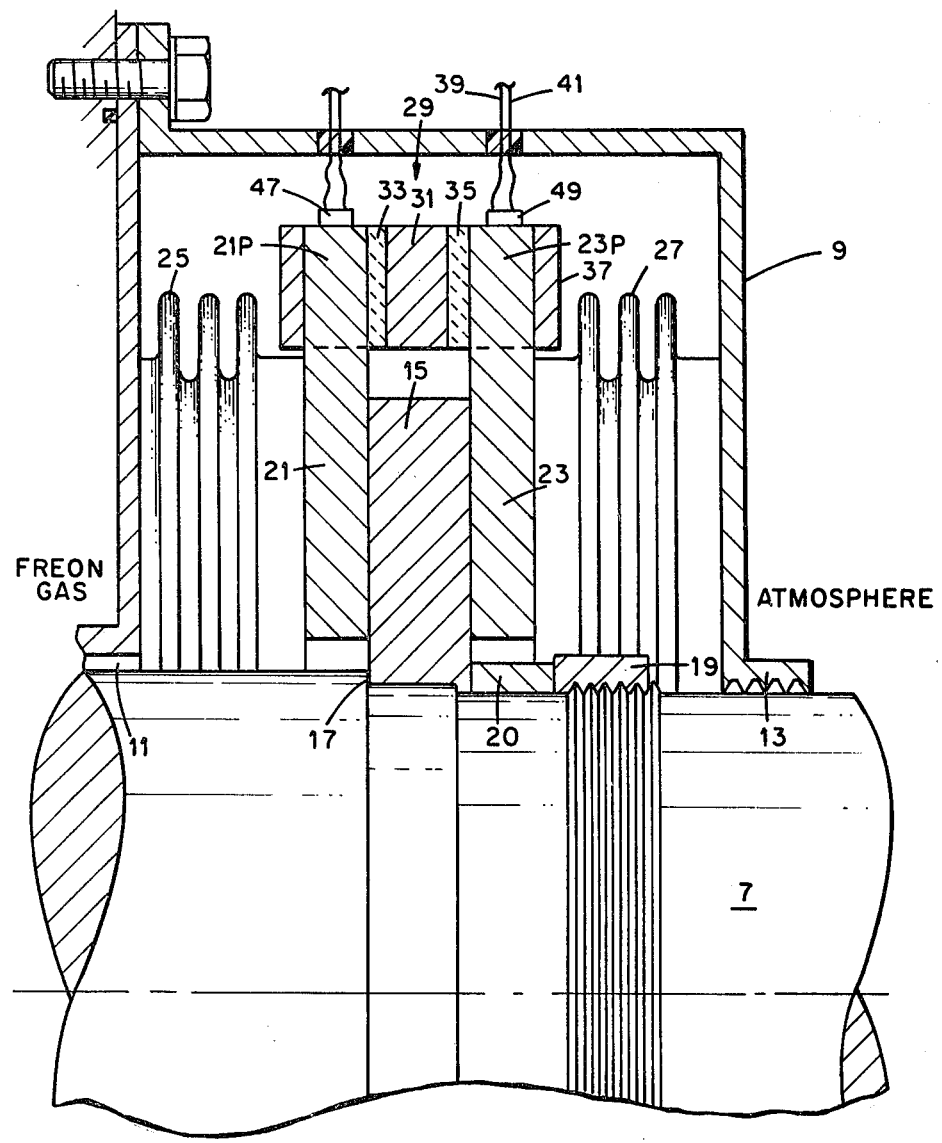
FIG. 2 is an enlarged sectional view of part of FIG. 1, a housing encompassing a segment of the shaft also being shown.

Referring to FIGS. 1–3, the numeral 7 designates the drive shaft of a conventional rotary Freon turbine (not shown). An impervious stationary housing 9 encompasses a section of the shaft. As shown, the shaft and the inner end of the housing define an annular clearance 11 which is in direct communication with gaseous Freon at above-atmospheric pressure. The outer end of the housing carries a labyrinth seal 13 for limiting leakage along the shaft to or from atmosphere. An annular sealing disc 15 having very flat, parallel faces is mounted on the shaft to extend radially therefrom and to rotate therewith. The disc is clamped against a shaft shoulder 17 by a threaded ring 19 bearing on an annular spacer 20. Conventional sealing rings (not shown) are provided on either side of the hub of disc 15.

Radially extending non-rotatable annular seal plates 21 and 23 extend freely about the shaft 7 and are mounted on opposite sides of the disc 15. Each plate has a very flat face which forms a sealing gland with the adjacent face of the disc 15. In accordance with the invention, the plates 21 and 23 extend outwardly of the disc and are formed at corresponding points with eight circumferentially spaced radial projections. Two typical, corresponding projections 21P and 23P are in view in FIG. 3. Projection 21P is carried by plate 21, and projection 23P by plate 23. As shown in FIG. 3, in this embodiment the projections are cylindrical segments.

Referring to FIG. 2, plate 21 is supported by a sealing bellows 25 which extends about the shaft. The bellows is mounted in compression, having one end is sealed to the housing, and the other end sealed to plate 21 just inwardly of its rim. Plate 23 is similarly supported by a sealing bellows 27. The bellows (a) permit each plate assembly to self-align with the disc 15 and (b) prevent gas flow except through the sealing glands. In applications where there are large pressure differentials across the seal assembly, the gland gap generated between plate 21 and disc 15 will be significantly smaller than that between plate 23 and disc 15. This will tend to destroy the usefulness of the second gland. This disadvantage may be eliminated by connecting the bellows to the inner margins of the seal plates, rather than as shown in FIG. 2. As a result, an almost equal pressure balance is achieved on the plates, with the outside of each plate "seeing" the intermediate pressure established between the glands. However, connecting the bellows in this alternative position requires more electrical power to achieve the intended plate motion.

Referring to FIGS. 2 and 3, the various pairs of confronting plate projections 21P and 23P are incorporated in respective transducer assemblies 29. The typical assembly 29 includes a rectangular support 31, which is fitted between rectangular piezoelectric crystals, or transducer elements, 33 and 35. The crystals are chosen to respond to suitable electric excitation by repeatedly expanding and contracting in the direction of the axis of the shaft; that is, they are polarized so that they respond to an oscillatory excitation current by vibrating in the thickness mode. As shown in FIG. 3, the crystals 33 and 35 are in respective contact with the flat faces of plate projections 21P and 23P. A ring 37 clamps these various elements together, maintaining the crystals under compressive loading to provide hard and uniform coupling between each crystal and its associated plate projection 21P or 23P. Preferably, the components of the transducer assembly have similar moduli of elasticity, and the crystals are mounted in shrink-fit relation with ring 37, in the manner described in the above-cited patents incorporated by reference.

In the embodiment illustrated in FIGS. 1–3, the components 21P, 23P, 31 and 37 are electrically conductive, and the oscillatory excitation current for the crystals is supplied through electrical (e.g., leads 39 and 41, FIG. 2), connected to the support 31 and ring 37, respectively. The other ends of the leads are connected to receive an electrical drive signal having an appropriate voltage and frequency. It is preferable that the seal components be designed with natural frequencies matching the drive frequency for the crystal. In the illustrated embodiment, the transducer assemblies 29 are dimensioned so that the plates 21 and 23 are sealably engaged with rotatable disc 15 when the crystals are in the unexcited state.

The piezoelectric crystals 33 and 35 may be of any suitable type. They may, for instance, be an electrostrictive ceramic—e.g., Clevite Type PZT4 (Clevite Corporation). In the event the crystals are of the Clevite type, the other components of the transducer assembly (e.g., support ring 31, ring 37, plates 23 and 23) may be composed aluminum or titanium. The rotator 15 may for example, be composed of 52100 steel or other dimensionally stable metals or ceramics. The bellows may be of any suitable material, such as metal or plastic.

The crystals 33 and 35 may be connected and disconnected from their electrical supply either manually or by instrumentation. When the turbine shaft 7 is not rotating, the crystals are disconnected and not subject to vibration. At this time, the inner annular portions of the non-rotating plates 21 and 23 are in sealing engagement with the rotator 15, preventing leakage along the shaft. When shaft rotation is to be initiated, the crystals are connected to the above-mentioned electrical supply and thus vibrate transversely. This vibration is transmitted through the various projections 21P and 23P to the main portions of the plates 21 and 23, which vibrate axially. This axial movement relative to the rotator produces an intervening layer of compressed ambient gas between the confronting surfaces of each plate and the disc. Thus, these surfaces now define narrow, annular, flow-restricting clearances whose width is essentially unaffected by the speed of the shaft rotation, temperature, or the pressure of the ambient gas. The running clearances may be adjusted by altering the frequency or voltage of the input to the crystals. The bellows 25 and 27 not only provide sealing but also accommodate slight axial movements of the plates and permit some radial self-centering of the same.

Figure 4:
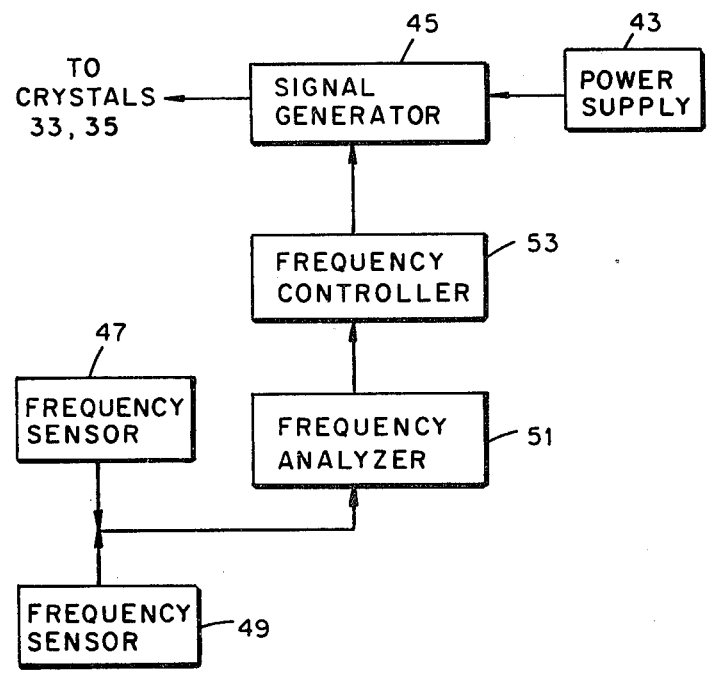
FIG. 4 is a block diagram of instrumentation for use with the sealing arrangement shown in FIGS. 1–3, the instrumentation being designed to respond to incipient rubbing by increasing the running clearance between sealing surfaces.

The sealing system may include instrumentation for automatically adjusting the running clearances of the seal in order to keep leakage to the minimum. For example, instrumentation may be provided to maintain the clearances just above the value where rubbing between the plates and the rotator occurs. Referring to FIG. 4, the instrumentation may be an electrical feedback arrangement comprising conventional components and including a power supply 43 for a signal generator 45. The generator provides the inputs for the crystals 23 and 35. Any suitable sensors 47 and 49 (e.g., phono pickups or piezoelectric crystals) are mounted respectively on the non-rotating seal plates 21 and 23 (see FIG. 1) to respond to any rubbing between these plates and the disc 15 by generating output signals of a distinctive frequency. These signals are fed to a frequency analyzer 51, which responds by sending a signal to a frequency controller 53, which adjusts the frequency of the generator output as required to open the plates 21 and 23 slightly to eliminate rubbing. Such a control system operates effectively with gases having different properties; that is, the system may be set to provide a desired operating clearance for any one of many ambient gases. If desired, the control circuitry may be designed to respond to voltage changes in the outputs from the sensors and to adjust the voltage inputs to the crystals accordingly. In another clearance-control arrangement, capacitance probes may be provided to continuously generate outputs which are proportional to the widths of the running clearances. These outputs may be compared to a reference value, and the resulting error signals may be used to adjust the inputs to the crystals as required to reduce deviations from the reference value.

The foregoing description of a preferred embodiment of the invention has been presented to enable others skilled in the art to utilize the invention in various other embodiments and with various modifications. For example, it will be apparent that the crystals 21 and 23 may, if desired, be replaced with a single radially polarized tubular piezoelectric element. Again, it will be apparent that the components of the transducer assembly 29 need not be electrically conductive, in which case the leads 29 and 41 may be connected directly to the crystals. If desired, the crystals may be provided with current-conductive coatings. The number of transducer assemblies 29 needed to effect uniform movement of the plate(s) may vary with the particular application. If desired, the plates 21, 23 may be excited at different frequencies to compensate for pressure differential, in which case, these plates need not be identical.

In an alternative form of the invention, the shaft seal assembly may utilize only one sealing gland comprising a rotating disc and a single non-rotatable plate of the kinds described.

Figure 5:
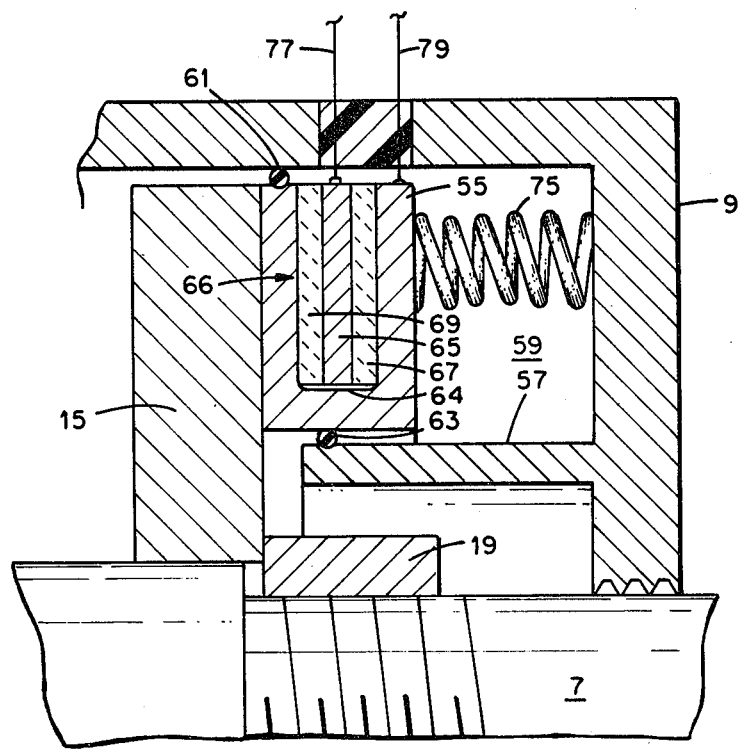
FIG. 5 is a fragmentary longitudinal-section view of another embodiment of the invention as mounted on a shaft.

FIG. 5 illustrates another embodiment of the invention, one which does not require the use of bellows. For convenience, only a typical portion of a single sealing gland 15, 55 is shown. In FIG. 5, the shaft 7 and rotating seal disc 15 are of the kinds already described, whereas the housing 9 has been modified by the addition of an inner annular wall 57 which extends toward the disc, defining an annular chamber 59, which extends about the shaft. The non-rotating seal plate 55 is mounted in the chamber and extends about the shaft. The outer and inner circumferences of the plate are sealed to the housing by O-rings 61 and 63, respectively, which accommodate axial movement of the plate.

Referring to FIG. 5, the rim of the non-rotating plate 55 is formed with a continuous U-shaped groove 64. Circumferentially spaced, rectangular transducer assemblies are shrink-fitted in the groove, as illustrated for typical transducer assembly 66. Assembly 66 includes a support (backup) plate 65, sandwiched between transducer elements in the form of piezoelectric crystals 67 and 69. The support 65 and the plate 55 are electrically conductive. The crystals are polarized for vibration in the thickness mode, and the mating radially extending faces of the crystals, seal plate 55, and support 65 are flat and parallel.

Still referring to FIG. 5, a helical spring 75 is seated against the housing and seal plate 55, urging the latter into engagement with the disc 15. Electrical leads 77 and 79 extending sealably through the housing are respectively connected to the seal plate and the backup plate to energize the crystals. When energized, the crystals vibrate in the thickness mode, vibrating the plate 55 and producing an intervening layer of compressed ambient gas between the confronting surfaces of the plate 55 and disc 15. Thus, these surfaces define a narrow, annular, flow-restricting clearance whose width is essentially unaffected by the speed of shaft rotation, temperature, and the pressure of the ambient gas. In an alternative arrangement, the array of transducer assemblies 66 may be deployed in recesses provided in the outer face of plate 55. Each transducer assembly may be maintained in compression by a plug which is threaded into the plate and bears on the assembly.

The invention has been illustrated above in terms of transducer elements of the electrostrictive type, but it will be apparent to those familiar with the art that magnostrictors (e.g., permanickel and permendur magnetostrictive transducers) may be used instead.

The foregoing description of a preferred embodiment of the invention has been presented to best explain the principles of the invention and enable others skilled in the art to utilize it in various embodiments and modifications suited to the particular use contemplated. Given the teachings herein, one versed in the art will be able to determine the most suitable parameters for a specific application, without resorting to more than routine experimentation.

It is intended that the scope of the invention be defined by the appended claims.

What is claimed is:

1. A shaft seal for use in a gas atmosphere, comprising:

a sealing gland comprising an annular disc and an annular plate in face-to-face sealing relation, said disc being mounted on and rotatable with a shaft, said plate being movable along the axis of said shaft and carrying an array of transducer assemblies disposed about said axis, each transducer assembly including a transducer element constructed of a material selected from the group consisting of electrostrictive and magnetostrictive materials, said transducer element being responsive to electrical excitation by vibrating in the direction of said axis and being mounted to impart its vibration to said plate, and means for electrically exciting the transducer elements to effect axial vibration of said plate and generation of an interfacial layer of compressed ambient gas between said plate and disc.

2. The shaft seal of claim 1 wherein said transducer elements are respectively mounted to radially extending projections of said plate.

3. The shaft seal of claim 2 wherein each transducer element and its associated plate projection are mounted within and maintained under compression by a ring.

4. The shaft seal of claim 1 wherein said transducer elements are mounted in recesses in the rim portion of said plate.

5. The shaft seal of claim 1 wherein said transducer elements are disposed in recesses in the outer face of said plate.

6. A rotary shaft seal assembly, comprising:
a shaft which is rotatable about an axis,
a housing containing a gas and encircling said shaft,
an annular disc affixed to said shaft for rotation therewith and extending radially therefrom,
an annular, non-rotatable, axially movable plate extending about said shaft and having a face thereof in sealing contact with a face of said disc,
a sealing bellows extending about said shaft and supporting said plate, said bellows being mounted in compression with one end sealed to the outer face of said plate and its other end sealed to said housing,
an array of transducer elements carried by said plate and disposed about said axis, said elements responding to electrical excitation by vibrating in the direction of said axis and being mounted in compression to impart such vibration to said plate, and
means for electrically exciting the transducer elements to effect axial vibration of said plate and generation of a compressed layer of gas between the confronting face of said plate and disc, thus providing a clearance therebetween.

7. The shaft seal of claim 7 wherein said transducer elements are piezoelectric crystals.

8. The shaft seal of claim 7 wherein said transducer elements are magnetostrictors.

9. A rotary shaft seal assembly, comprising:
a shaft which is rotatable about an axis,
a housing containing a gas and encircling said shaft,
an annular disc affixed to said shaft and extending radially therefrom,
a pair of annular non-rotatable plates extending freely about said axis and disposed on opposite sides of said disc, each plate being movable in the direction of said axis and having an inner face contiguous with a face of said disc,
first and second arrays of transducer elements respectively carried by said plates and extending about said axis, each transducer array being responsive to electrical excitation by vibrating in the direction of said axis and being mounted to impart such vibration to its associated plate, and means for supplying excitation current to said transducer elements to effect axial vibration of said plates and generate intervening films of compressed ambient gas between said disc and said inner face of each plate.

10. The shaft seal of claim 9 wherein said arrays are mounted to radially extending projections of their respective plates.

11. The shaft seal of claim 9 wherein said arrays are recessed in the rim portions of their associated plates.

12. The shaft seal of claim 9 wherein said transducer elements are mounted to be in compression.

13. The shaft seal of claim 9 wherein said plates are supported respectively by sealing bellows, each bellows extending freely about said shaft and having its ends sealed respectively to said housing and the outer face of its associated plate.

14. The shaft seal of claim 13 wherein each of said bellows is connected to the outer marginal area of its associated plate.

15. The shaft seal of claim 13 wherein each of said bellows is connected to the inner marginal area of its associated plate.

16. A shaft seal for use in a gas atmosphere, including:
a sealing gland comprising an annular disc and an annular plate in face-to-face sealing contact, said disc being mounted on and rotatable with a shaft, said plate being movable along the axis of said shaft and resiliently biased toward said disc, said plate carrying an array of transducer assemblies disposed about said axis, each transducer assembly including a transducer element constructed of a material selected from the group consisting of electrostrictive and magnetostrictive materials, said transducer elements being responsive to electrical excitation by vibrating in the direction of said axis and being mounted to impart vibration to said plate, and means for: (a) impressing electrical excitation inputs on the transducer elements to effect axial vibration of said plate and generate an interfacial layer of compressed ambient gas between said plate and disc; (b) sensing incipient rubbing between said plate and disc; and (c) responding to said rubbing by changing the inputs to said transducer elements to effect increased separation of said plate and disc.

17. A method for sealing a shaft which is rotatable about an axis and is encircled by a gas-containing housing, said method comprising:
affixing to said shaft an annular disc extending radially therefrom,
providing an annular plate which extends about said shaft and is sealably supported by said housing for movement therein in the direction of said axis, said plate being resiliently biased to a position where it is in sealing facial engagement with said disc, said plate carrying an array of transducer assemblies disposed about said axis, each assembly including a transducer element which in response to electrical excitation vibrates in the direction of said axis and imparts axial vibration to said plate, and
electrically exciting said transducer elements from startup through shutdown of said shaft to axially vibrate said plate and generate a layer of compressed ambient gas between said disc and plate to maintain a clearance between the same.

18. The method of claim 17 further characterized by the steps of (a) sensing incipient rubbing between said disc and plate during rotation of said disc and (b) altering the excitation of said transducer elements in response to such rubbing to separate said disc and plate sufficiently to eliminate said rubbing.

* * * * *